United States Patent [19]

Brookman

[11] 3,999,968
[45] Dec. 28, 1976

[54] DUST COLLECTOR

[75] Inventor: Roger S. Brookman, Amherst, N.Y.

[73] Assignee: American Precision Industries, Inc., Buffalo, N.Y.

[22] Filed: Jan. 19, 1976

[21] Appl. No.: 650,173

[52] U.S. Cl. .................................. 55/284; 55/303; 55/341 NT

[51] Int. Cl.² ...................................... B01D 46/04

[58] Field of Search ............ 55/273, 283, 284, 293, 55/301, 302, 303, 341 R, 341 NT, 341 M, 341 H, 341 MC, 341 PC, 341 HM; 210/333, 411

[56] References Cited

UNITED STATES PATENTS

| | | | |
|---|---|---|---|
| 2,867,289 | 1/1959 | Sare | 55/341 HM X |
| 3,421,295 | 1/1969 | Swift et al. | 55/302 |
| 3,509,698 | 5/1970 | Medcalf et al. | 55/302 |
| 3,765,152 | 10/1973 | Pausch | 55/302 X |
| 3,838,555 | 10/1974 | Kubiak | 55/273 X |
| 3,864,108 | 2/1975 | Brookman | 55/302 |
| 3,877,899 | 4/1975 | Bundy et al. | 55/302 |

FOREIGN PATENTS OR APPLICATIONS

| | | | |
|---|---|---|---|
| 812,244 | 4/1959 | United Kingdom | 55/283 |
| 1,016,556 | 1/1966 | United Kingdom | 55/302 |

*Primary Examiner*—Frank W. Lutter
*Assistant Examiner*—Kathleen J. Prunner
*Attorney, Agent, or Firm*—Sommer & Sommer

[57] ABSTRACT

A dust collector has a dirty air chamber arranged to receive a flow of dirty air containing suspended solid particulate material, a clean air chamber communicating with exhaust, and a plurality of filter bags arranged to have their interior surfaces communicate with the dirty air chamber and operative to separate solid particulate material from cleaned gas passing therethrough. The improvement includes an elongated venturi-like member arranged to service a number of such filter bags, and a conduit arranged to deliver high energy pulses of reverse air through the venturi-like member countercurrent to the normal flow of dirty gas therethrough. Such pulses of reverse air momentarily create a reduced pressure within the serviced filter bags, and induce cleaned gas to flow back through the serviced filter bags to dislodge and remove accumulated solid particulate material from the interior surfaces of such bags.

7 Claims, 4 Drawing Figures

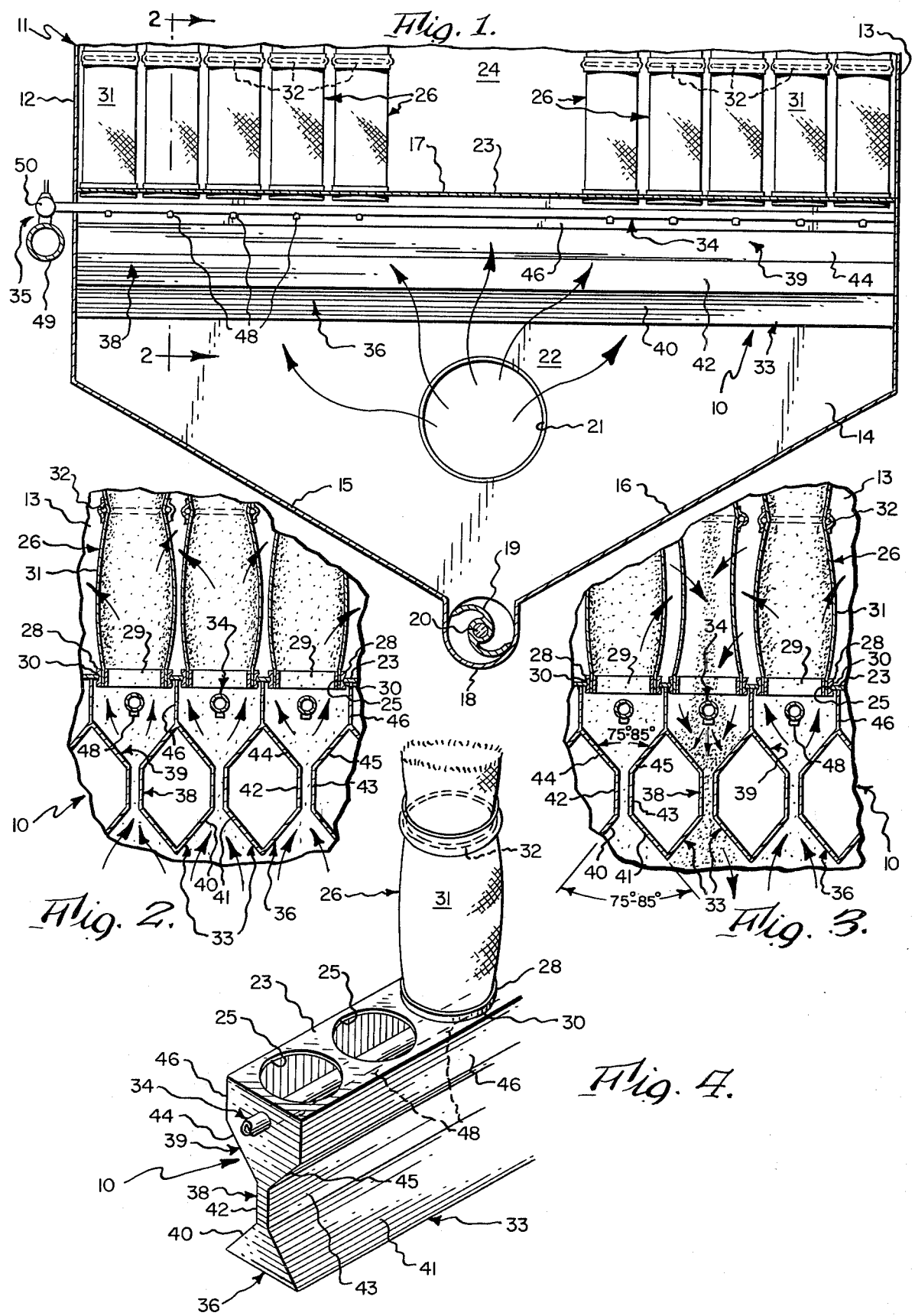

3,999,968

DUST COLLECTOR

BACKGROUND OF THE INVENTION

1. Field of the Invention

The present invention relates generally to the art of dust collectors, which are adapted to separate solid particulate material from cleaned gas passing through a filter medium, and more particularly to an improved dust collector wherein cleaned gas is momentarily induced to flow back through the filter medium, countercurrent to the normal direction of flow during the filtration operation, to dislodge and remove solid material accumulating on one side of the filter medium.

2. Description of the Prior Art

Dust collectors having a filter medium operatively arranged to separate solid particulate material from cleaned gas passing therethrough, are known in the prior art, as representatively shown in my prior U.S. Pat. No. 3,864,108. In this prior patent, a plurality of filter bags were suspended in a dirty air chamber and a pulse of positively-pressurized cleaning gas, the velocity of which was further increased by passage through a venturi-like tube, was introduced into the bags to shock or puff accumulated solids collecting on the outer surface of the bags.

In U.S. Pat. No. 3,765,152, a jet of compressed air was passed through a venturi-tube to induce a reverse flow of cleaned air through the bags. However, this patent appears to provide a separate nozzle and venturi for each filter bag, and provides relatively complicated structure of considerable expense.

Additional details of other prior art structure may be shown in U.S. Pat. No. 3,368,328.

SUMMARY OF THE INVENTION

The present invention overcomes disadvantages in prior art structures by providing a unique improvement for a dust collector.

The improvement is particularly adapted for use in a dust collector having a dirty air chamber arranged to receive a flow of dirty air laden with suspended solid particulate material, a clean air chamber communicating with exhaust, and a plurality of filter bags operatively arranged to have their interior surfaces communicate with the dirty air chamber and operative to separate solid particulate material from cleaned air passing therethrough.

The improvement broadly includes an elongated venturi-like member arranged to separate a number of serviced filter bags from the dirty air chamber, this member having an entrance nozzle section, a throat section, and an exit nozzle section; a conduit arranged in the exit nozzle section and having a number of nozzles, such number preferably corresponding to the number of serviced filter bags, each of these nozzles being arranged proximate the open mouth of a filter bag and operative to discharge a pulse of high energy gas, such as compressed air, back through the various sections of the venturi-like member countercurrent to the normal flow of gas therethrough during the normal filtering operation; and supply means operatively arranged to supply a plurality of sequential pulses of such high energy gas to the conduit to be discharged through the nozzles to momentarily create a reduced pressure within the bags.

During the normal filtering operation, dirty air may pass through the venturi-like member to enter the filter bags, where solid particulate material is separated from cleaned air passing therethrough.

During the "reverse air" or bag cleaning operation, the discharged pulses of such high energy gas passing back through the venturi-like member momentarily create a reduced pressure within such serviced bags, which reduced pressure is lower than the pressure in the clean air chamber. Thus, the high energy pulses passing through the venturi-like member are operative to invert the normal positive pressure differential within the bags with respect to the clean gas chamber, and to induce cleaned air to flow back through the bags to dislodge and remove solid particulate material adhering to the inside surface of these serviced bags.

Accordingly, one general object of the present invention is to provide an improved dust collector having effective means for dislodging and removing solid particulate material collecting on the filter bag inner surfaces.

Another general object is to provide an improved dust collector wherein a number of filter bags may be serviced by a manifold venturi-like member.

Another object is to provide an improved design for a dust collector which is relatively uncomplicated in structure, relatively inexpensive to manufacture, and which affords the opportunity for compactness in size while simultaneously affording an effective bag cleaning operation.

These and other objects and advantages will become apparent from the foregoing and ongoing written specification, the drawings, and the appended claims.

BRIEF DESCRIPTION OF THE DRAWING FIGURES

FIG. 1 is a fragmentary transverse vertical sectional view of an improved dust collector, this view illustrating the dirty air chamber, the clean air chamber, and a row of filter bags operatively arranged to separate solid particulate material from cleaned gas passing therethrough, this view further showing a venturi-like member in central section, the conduit, and the supply means.

FIG. 2 is an enlarged fragmentary vertical sectional view thereof, taken generally on line 2—2 of FIG. 1, showing three adjacent venturi-like members arranged to service three adjacent rows of filter bags, the arrows in this view indicating the normal upward flow of dirty air into the filter bags.

FIG. 3 is a view generally similar to the view of FIG. 2, but illustrating the middle nozzles discharging a high energy pulse of compressed gas downwardly through the middle venturi-like member to momentarily invert the normal pressure differential and induce a reverse flow of cleaned gas back through the filter bags of the middle row to dislodge and remove accumulated solids.

FIG. 4 is a fragmentary perspective detail view of the left marginal end portion of one venturi-like member, with two filter bags removed for clarity of illustration.

DESCRIPTION OF THE PREFERRED EMBODIMENT

At the outset, it should be clearly understood that like reference numerals are intended to identify the same elements and/or structure consistently throughout the several drawing figures, as such elements and/or structure may be further described or explained by the entire written specification of which this detailed description is an integral part.

Referring initially to FIG. 1, the present invention, of which the presently preferred embodiment is generally indicated at 10, is intended for use in a dust collector, of which one species is generally indicated at 11.

This particular species of dust collector includes an upper rectangular structure defined by a longitudinally-extending planar vertical left panel 12, a longitudinally-extending planar vertical right panel 13, a transversely-extending planar vertical back panel 14, and a transversely-extending planar vertical front panel (not shown); and a lower longitudinally-elongated hopper structure defined by a pair of longitudinally-extending downwardly and inwardly inclined planar left and right hopper panels 15, 16, respectively, having their upper divergent marginal end portions suitably secured to left and right upper panels 12, 13, respectively, extending the full length of the dust collector between the front and rear panels thereof, and having their lower convergent marginal end portions suitably secured to a longitudinally-extending trough 18 having a substantially U-shaped transverse cross-section. A longitudinally-elongated screw conveyor 19 is shown as being operatively arranged in trough 18, and has the front and rear marginal end portions (not shown) of its central shaft 20 suitably journalled on the front and rear panels of the dust collector. In the well known manner, a suitable means may be provided to rotate shaft 20 to cause the screw conveyor 19 to convey solid material accumulating in the bottom of the hopper structure, from the dust collector. The back panel 14 is shown further provided with an inlet opening 21 through which a flow of dirty air, containing suspended solid particulate material, may be supplied to the dirty air chamber, generally indicated at 22, of the dust collector.

This dust collector 11 is illustrated as further including a rectangular horizontal plate-like member 23 joining the four vertical panels of the dust collector and separating the lower dirty air chamber 22 from an upper clean air chamber, generally indicated at 24. This plate-like member is provided with a plurality of through holes, severally indicated at 25, which are arranged in a longitudinally-spaced series of transversely-extending rows, there being ten of such holes 25 in each such row of the illustrated dust collector. In the illustrated embodiment, the 10 filter bags of each row are arranged in two spaced banks of five each, the intermediate space 17 between these bags being available for use as a walkway for servicing the bags. Moreover, in this preferred embodiment, the longitudinal and transverse centerline spacing between adjacent holes 25 of the banks are equal to one another.

The dust collector 11 is depicted as further including a plurality of vertically-elongated substantially cylindrical filter bags, severally indicated by the general reference numeral 26, there being one filter bag for each of holes 25. Each of these filter bags 26 has its upper marginal end portion (not shown) suitably suspended or hung from the top (not shown) of the dust collector. The lower marginal end portion of each filter bag is suitably captured between an outer ring 28 and an inner ring 29 selectively attachable to the outer ring. Moreover, the outer peripheral surface of outer ring 28 is shown provided with an annular recess or groove 30 to enable the outer ring 28 to be snapped into a hole 25 such that the marginal portion of plate-like member 23 surrounding such hole will be received in groove 30, thereby retaining the lower marginal end portion of the filter bag in this engaged position with the plate-like member 23. Moreover, the operative side walls 31 of these filter bags are formed of a suitable gas-permeable medium, such as cloth or the like, and the cylindrical shape of wall 31 may be maintained by a plurality of vertically-spaced shape-retaining rings 32 suitably sewn into pockets formed in the wall 31.

Thus, during normal filtering operation of the dust collector, dirty air may enter dirty air chamber 22 through inlet opening 21 and rise upwardly to enter the interior of filter bags 26 through their open lower mouths. Thereafter, the gas-permeable filter medium operates to separate the suspended solid particulate material from cleaned gas passing through the filter bags to enter clean air chamber 24.

However, during such normal flow of air upwardly through the dust collector, it will be appreciated by those skilled in this art, that the separated solid particulate material will tend to collect or accumulate on the interior surfaces of the filter bags, thereby increasing the resistance of the filter medium to a normal flow of air therethrough. Over a period of time, such accumulated solids may form a significant cake on the interior surfaces of the filter bags, and may substantially reduce the operating efficiency of the dust collector.

To alleviate this problem, the present invention provides a simple and yet highly effective means for removing such accumulated solids from the interior surfaces of the filter bags, and which is believed to result in a more facile combination of structure than that heretofore known in the prior art.

To this end, the present invention 10 is shown as broadly including a plurality of venturi-like members, severally indicated at 33; a corresponding plurality of conduits, severally indicated at 34; and a corresponding plurality of supply means, severally indicated at 35.

Referring now to FIGS. 1, 2 and 4, each elongated venturi-like member 33 is shown as extending transversely of the dust collector from left panel 12 to right panel 13. As best shown in FIG. 2, and with reference to the normal upward flow of dirty gas, each venturi-like member 33 is configured to have, in cross-section, a lowermost entrance nozzle section 36, an intermediate throat section 38, and an uppermost exit nozzle section 39. Still referring principally to FIG. 2, the entrance nozzle section 36 is defined by a pair of elongated upwardly and inwardly inclined left and right planar walls 40, 41, respectively, which extend the full width of the dust collector from left panel 12 to right panel 13, with their divergent lowermost marginal end portions communicating with the dirty air chamber. The throat section 38 is defined by a pair of elongated left and right vertical planar walls 42, 43, respectively, also extending the full width of the dust collector, and having their lowermost marginal end portions suitably secured to the convergent upper marginal end portions of entrance nozzle section left and right walls 40, 41, respectively. The exit nozzle section 39 is defined by a pair of elongated upwardly and outwardly inclined left and right planar walls 44, 45, respectively, also extending the full width of the dust collector, and having their convergent lowermost marginal end portions suitably connected to the uppermost marginal end portions of throat section walls 42, 43, respectively. The divergent upper marginal end portion of each of exit nozzle section walls 44, 45 is shown suitably connected to the plate-like member 23 between adjacent rows of holes 25 by an elongated planar vertical common wall 46, which also extends the full width of the dust collector.

Of course, in the commercial embodiment, spacers (not shown) may join the adjacent throat walls 42, 43 to maintain the desired spacing therebetween.

The various walls of the entrance nozzle, throat, and exit nozzle sections extend the full width of the dust collector from left panel 12 to right panel 13 so that each venturi-like member 33 may service the number of filter bags in a row. Thus, in the embodiment illustrated and described, each venturi-like member 33 is intended to service the ten filter bags in each row (FIG. 1), and one such venturi-like member is provided for each such row, this being fragmentarily illustrated in FIG. 2.

Adverting now to FIG. 1, a conduit 34 is provided in association with each venturi-like member 33. Each conduit 34 is shown as being an elongated pipe or tubular conduit which is arranged to penetrate left panel 12 and extend the full width of the dust collector. As best shown in FIG. 2, each conduit 34 is positioned between adjacent common walls 46, and is aligned with the transverse centerline of the holes 25 in a row. Moreover, each conduit is further provided with a number of discharge jets, severally indicated at 48, corresponding to the number of bags in each row. As may be best seen from a collective viewing of FIGS. 1 and 2, a jet 48 is provided on a conduit 34 vertically beneath each filter bag, and these jets are severally arranged to discharge a jet or pulse of a compressed gas, delivered by its associated conduit, downwardly into the exit nozzle and throat sections of its associated venturi-like member.

Adverting now to FIGS. 1 and 4, the supply means 35 is depicted as including a longitudinally-extending manifold pipe 49 having an electrically-operated solenoid value 50 communicating manifold pipe 49 with each row of conduits 34. This manifold pipe 49 is connected to a suitable source (not shown) of pressurized gas, such as compressed air. Thus, the series of solenoid valves 50 may be sequentially operated to supply momentary pulses of compressed air to conduits 34 for discharge through jets 48 downwardly, this being countercurrent to the normal upward flow of gas through the dust collector.

The operation of the improved dust collector may be best understood with reference to FIGS. 2 and 3.

Referring now to FIG. 2, persons skilled in this art will readily appreciate that a positive pressure in the dirty air chamber relative to the pressure in the clean air chamber, will cause dirty gas containing suspended solid particulate material, to flow upwardly through venturi-like members 33 to enter the filter bags 25 where such solid particulate material will be separated from cleaned gas passing therethrough, such normal filtering flow being indicated by the direction of the schematic arrows in FIG. 2.

The bag cleaning operation is illustrated for the middle row of filter bags in FIG. 3. When the solenoid valve 50 of this middle row is operated, a pulse of compressed air will be discharged, by each of the nozzles 48 in this row, downwardly to pass through the venturi-like member. The effect of these discharged jets will be to reverse the normal upward flow of dirty gas through the venturi-like member, and to rapidly reduce the pressure within the row of serviced filter bags to a value lower than the pressure of the clean air chamber. By so inverting the normal pressure differential of the filter bags with respect to the clean gas chamber, clean air in the clean gas chamber will be induced to flow back through the filter medium to dislodge separated solid particulate material adhering to the inside surfaces of the bags, and to convey such dislodged material back through the venturi-like member to reenter the dirty air chamber. Moreover, while the normal pressure differential between the dirty and cleaned gas chambers may cause the filter bag walls to bow outwardly (FIG. 2), the pressure inversion caused by the reverse flow of the discharged pulses of compressed air causes the bag walls to snap inwardly (FIG. 3) to assist in dislodging such material from the bag walls.

Several significant advantages are afforded by use of the inventive dust collector herein disclosed. First, the structure is relatively simple, inexpensive to manufacture, and has no unnecessary moving parts within the dirty air chamber. Secondly, the bags of one row may be cleaned without interfering with the normal filtering operation of adjacent rows. Thirdly, this design allows a desirable minimum spacing between the filter bags, thereby affording the opportunity for compactness in dust collector size while preserving the capability for efficient dust collector operation.

Of course, persons skilled in this art will quickly appreciate that various changes or modifications may be made. Thus, while the preferred embodiment illustrates each venturi-like member as servicing ten bags, this number is not deemed critical and the number of serviced bags may be increased or decreased, as necessary. Similarly, while each of the entrance and exit walls is shown as converging at an imaginary acute included angle of from 75° to 85° (FIG. 3), persons skilled in this art will readily appreciate that such angles may be varied, as necessary. Moreover, a second supply pipe may be provided adjacent the right panel 13 and utilized in tandem with the illustrated supply means. It should be further understood that the size, configuration and spacing of the filter bags, and the particular shape and dimensions of the venturi-like members may be altered or modified, as necessary, to fit the design parameters, such as the normal pressure in the dirty air chamber, the normal pressure in the clean gas chamber, the pressure of the compressed gas, the length of the jet pulses, and the concentration of suspended solids.

Therefore, while the presently preferred embodiment of the present invention has been shown and described, persons skilled in this art will recognize that this illustrated embodiment constitutes only one particular species of the broad invention, which is generally defined in the following claims.

What is claimed is:

1. In a dust collector having a dirty air chamber arranged to receive a flow of dirty air containing suspended solid particulate material, a clean air chamber communicating with exhaust, and a plurality of filter bags arranged to have their interior surfaces communicate with said dirty air chamber and operative to separate solid particulate material from cleaned air passing therethrough, the improvement comprising:

an elongated venturi-like member arranged to separate a number of said filter bags from said dirty air chamber, said member including an entrance nozzle section having a pair of entrance walls diverging in the direction of said dirty air chamber, an exit nozzle section having a pair of exit walls diverging in the direction of such filter bags, and an intermediate throat section having a pair of throat walls joining the convergent ends of said entrance and exit walls;

a conduit arranged in said exit nozzle section and having a number of jet nozzles, each of said nozzles being arranged proximate the open mouth of a filter bag and operative to discharge a pulse of compressed gas through said throat section countercurrent to the normal flow of gas passing therethrough; and supply means operatively arranged to supply a pulse of compressed gas to said conduit to be discharged through said jet nozzles to momentarily create a reduced pressure within said filter bags;

whereby, when said reduced pressure is created within said bags, cleaned gas is momentarily induced to flow back through said filter bags and said venturi-like member to dislodge and remove solid particulate material adhering to the interior surfaces of said filter bags.

2. The improvement as set forth in claim 1 wherein said supply means is operatively arranged to supply a plurality of sequential pulses to said conduit.

3. The improvement as set forth in claim 1 wherein the number of said jet nozzles corresponds to the number of said filter bags.

4. The improvement as set forth in claim 3 wherein each of said jet nozzles is centrally positioned beneath an open mouth of one of said filter bags.

5. The improvement as set forth in claim 1 wherein said entrance walls converge at an imaginary acute included angle of from 75° to 85°.

6. The improvement as set forth in claim 1 wherein said exit walls converge at an imaginary acute included angle of from 75° to 85°.

7. The improvement as set forth in claim 1 wherein said throat walls are parallel to one another.

* * * * *